United States Patent
Lee et al.

(10) Patent No.: US 9,727,786 B2
(45) Date of Patent: Aug. 8, 2017

(54) VISUAL OBJECT TRACKING SYSTEM WITH MODEL VALIDATION AND MANAGEMENT

(71) Applicant: Intel Corporation, Santa Clara, CA (US)

(72) Inventors: Jinwook Lee, Seoul (KR); Yongchan Park, Seoul (KR); Hongmo Je, Guemchun-Gu (KR); Tae-Hoon Kim, Seoul (KR)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 14/541,981

(22) Filed: Nov. 14, 2014

(65) Prior Publication Data
US 2016/0140394 A1  May 19, 2016

(51) Int. Cl.
G06K 9/00 (2006.01)
G06K 9/46 (2006.01)
G06T 7/246 (2017.01)

(52) U.S. Cl.
CPC ........ G06K 9/00711 (2013.01); G06K 9/4642 (2013.01); G06K 9/4652 (2013.01); G06T 7/246 (2017.01)

(58) Field of Classification Search
CPC ............. G06K 9/00711; G06K 9/4642; G06K 9/4652; G06T 7/246
See application file for complete search history.

(56) References Cited

U.S. PATENT DOCUMENTS

| 8,615,105 | B1 | 12/2013 | Cheng et al. | |
|---|---|---|---|---|
| 2010/0166262 | A1* | 7/2010 | Wedge | G06K 9/00369 382/103 |
| 2011/0142282 | A1 | 6/2011 | Srikrishnan et al. | |
| 2011/0243381 | A1* | 10/2011 | Tsagkatakis | G06K 9/6215 382/103 |
| 2013/0272570 | A1* | 10/2013 | Sheng | G06F 3/017 382/103 |
| 2015/0117773 | A1* | 4/2015 | Kamiya | G06K 9/00362 382/165 |

(Continued)

OTHER PUBLICATIONS

Rodriguez-Canosa et al., "A Real-Time Method to Detect and Track Moving Objects (DATMO) from Unmanned Aerial Vehicles (UAVs) Using a Single Camera, Remote Sensing", Apr. 2012, pp. 1090-1111.

(Continued)

*Primary Examiner* — Jonathan S Lee
(74) *Attorney, Agent, or Firm* — Green, Howard & Mughal LLP

(57) ABSTRACT

System, apparatus, method, and computer readable media for on-the-fly captured image data object tracking. An image or video stream is processed to detect and track an object in concurrence with generation of the stream by a camera module. In one exemplary embodiment, HD image frames are processed at a rate of 30 fps, or more, to track one or more target object. In embodiments, object detection is validated prior to employing detected object descriptor(s) as learning data to generate or update an object model. A device platform including a camera module and comporting with the exemplary architecture may provide 3A functions based on objects robustly tracked in accordance with embodiments.

23 Claims, 6 Drawing Sheets

(56) References Cited

U.S. PATENT DOCUMENTS

2015/0310624 A1* 10/2015 Bulan .................... G06K 9/66
  382/103
2016/0133022 A1* 5/2016 Sarkis .................. G06T 7/0044
  382/103

OTHER PUBLICATIONS

Hideki Tsutsui et al., "Optical Flow-Based Person Tracking by Multiple Cameras", IEEE Multisensor Fusion and Integration for Intelligent System, 2001, Osaka, Japan, pp. 91-96.

Hideki Tsutsui et al., "Optical Flow-Based Person Tracking by Multiple Cameras", IAPR Workshop on Machine Vision Applications, Nov. 17-19, 1998, Chipa Japan pp. 418-421.

International Search Report and Written Opinion for International Patent Application No. PCT/US2015/055371, mailed on Jan. 28, 2016.

Hare, et al., "Struck: Structured Output Tracking with Kernels", IEEE, International Conference on Computer Vision, 2011, pp. 263-270.

Mehta, et al., "Real Time Object Detection and Tracking: Histogram Matching and Kalman Filter Approach", vol. 5, Department of Electronics and Communication, Jaypee Institute of Information Technology, IEEE, 2010, pp. 796-801.

Chen, et al., "Multi-Object Tracking via Constrained Sequential Labeling", Oregon State University, 2014, 8 pages.

Kalal, et al., "Tracking-Learning-Detection", IEEE, Transactions ON Pattern Analysis And Machine Intelligence, vol. 6, No. 1, Jan. 2010, pp. 1-14.

Naik, et al., "A Scale Adaptive Tracker Using Hybrid Color Histogram Matching Scheme", College of Engineering, Pune-411005, India, 2009, 6 pages.

B. Karasulu, et al., "Chapter 2 Moving Object Detection and Tracking in Videos", Performance Evaluation Software, SpringerBriefs, The Author(s) 2013, 25 pages.

International Preliminary Report on Patentability dated May 26, 2017 for PCT Patent Application No. PCT/US15/55371.

* cited by examiner

VISUAL OBJECT TRACKING SYSTEM WITH MODEL VALIDATION AND MANAGEMENT

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. The introduction of streaming video from mobile digital cameras has ushered in an era with unprecedented volumes of video data.

The video stream generated by any camera will include various objects moving in and out of the camera's field of view. Visual object tracking is a process of locating an arbitrary object of interest over time in a sequence of images captured from a camera. Adaptive tracking-by-detection methods are widely used in computer vision for tracking arbitrary objects. The definition of an "object" can vary from a single instance to a whole class of objects. One objective of tracking is to associate objects in consecutive images, based on the detection or tracking of previous image frames. Real-time visual object tracking entails processing the video data stream at the camera frame-rate to determine automatically a bounding box of a given object, or determine that the object is not visible, in each frame.

Challenges of object tracking include background clutter and dealing with changes in an object's appearance that may make the object's appearance in an initial frame irrelevant. Changes in scale, partial occlusion, changes in shape, and illumination are all events, which may change an object's appearance over a number of consecutive frames.

There has been considerable research on fast and automated methods for object tracking. One tracking framework, referred to as tracking-learning-detection (TLD) decomposes the tracking task into three sub-tasks of tracking, learning, and detection, which can operate concurrently. The sub-task of online learning has proven particularly challenging. Online learning entails updating target models during run-time in an effort to make an object tracker robust to the changes in object shape, view, and illumination. It is difficult to update and manage the models in real time where frequent tracking misses may occur, particularly for low power mobile device hardware resources (e.g., processors and memory). For example, learning tasks that employ support vector machines (SVMs) often require complicated data structures and rely on regression approaches having a high computational cost/complexity necessitating powerful hardware to process high resolution images (e.g., full HD) in real-time (e.g., at 30+ frames per second). Since video capture by mobile devices is so popular, a powerful CPU and/or GPU is not always available. Hence, many of the platforms responsible for generating the vast majority of a user's archival image data have been thus far ill equipped to perform sophisticated object tracking.

Automated visual object tracking that can be implemented by ultra light and low-power mobile platforms in real time with a video stream captured at potentially high frame rates (e.g., 30 frames/second, or more) is therefore highly advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
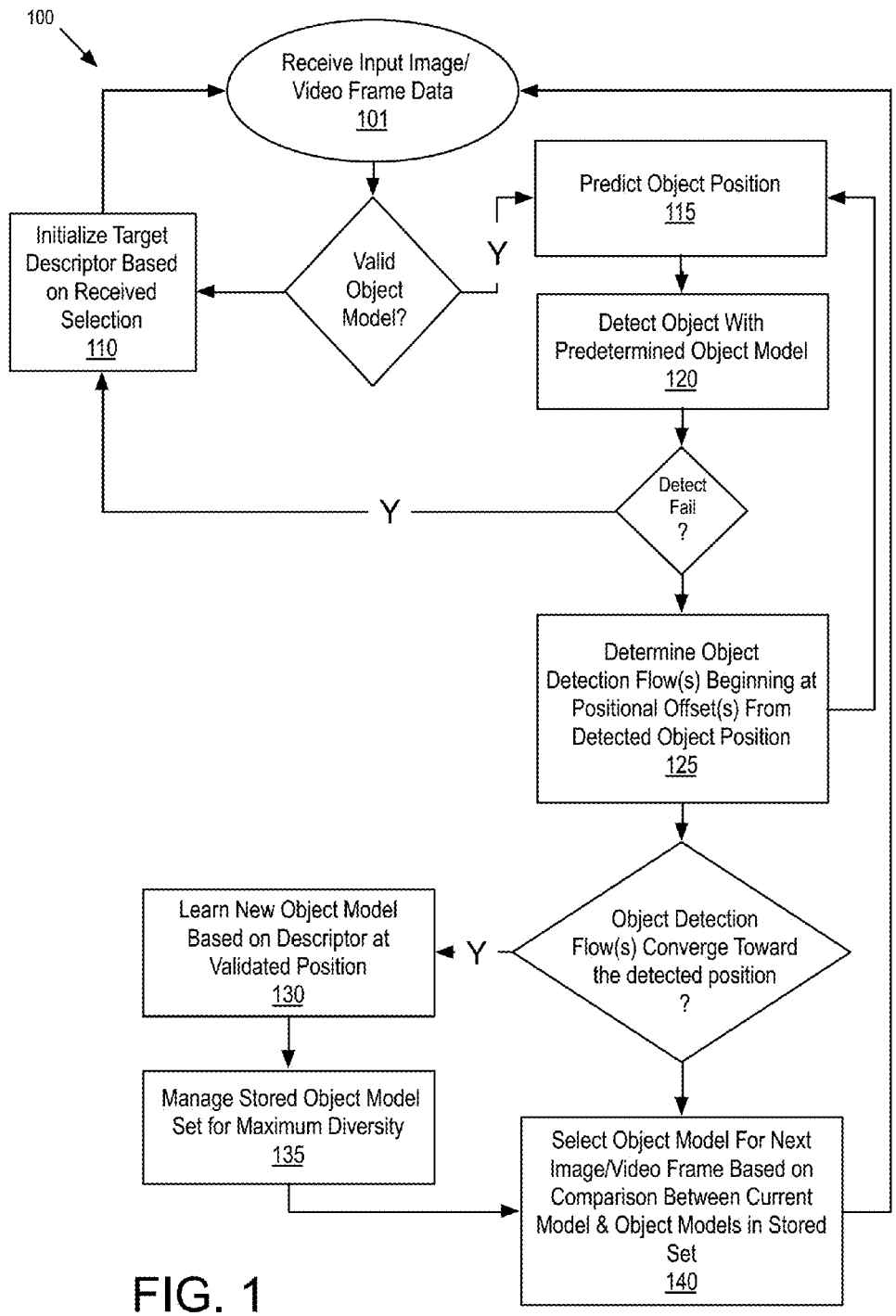
FIG. 1 is a flow diagram illustrating an object tracking method with model validation, in accordance with one or more embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for real-time image-based (visual) object tracking. As used herein, object tracking entails object detection over a time sequence, through which a temporal sequence of position coordinates associated with motion of the object across consecutive frames of image data is generated. Beyond position, other object features may also be updated as part of a state vector tracking one or more of object size, color texture, shape, etc. In "real-time" visual object tracking, an image data (video) stream is analyzed frame-by-frame concurrently with frame-by-frame generation or receipt of the stream. Frame-by-frame object detection may be performed based on information on an object's position within a prior frame, or it may be independently determined for each frame. The object tracking algorithm(s) employed in exemplary embodiments are operable at the frame level, and may be performed on every consecutive image frame, or on a subset of frames such as key frames. The rate requirement for real-time object tracking is a function of a frame rate, for example associated with a camera module (CM). As described below, a device platform including a CM and comporting with the exemplary architecture may provide video camera functionality with real time object tracking within the power and processing bandwidth constraints typical of current mobile handsets. In further embodiments, at least the positional information associated with a tracked object is passed to a 3A (automatic focus, automatic exposure, automatic white balance) engine that manages further processing of the image frame(s).

FIG. 1 is a flow diagram illustrating a visual object tracking method 100 employing model validation and management, in accordance with one or more embodiment. Method 100 is to be implemented automatically by an object tracking device including at least a processor further having logic circuitry. Method 100 is therefore one embodiment of a "computer-implemented" method of visual object tracking.

For adaptive object tracking devices, which attempt to constantly update target object models, one difficulty of online model learning is that there is often no mechanism to limit the coverage of the learning data utilized. Method 100 however advantageously includes a validation of the learning data candidates. Embodiments of a validation operation described herein can advantageously limit the coverage of the learning data input into an object model learning algorithm so as to avoid providing unsuitable learning data that might otherwise lead to a subsequent tracking failure.

Method 100 also advantageously maintains diversity of object models by culling the most redundant object model(s) as new, updated models are added. In practice, the inventors have found a validated model object tracking (VMOT) device implementing an embodiment of method 100 has improved tracking performance relative to certain known techniques when tested in various challenging use cases.

Referring to FIG. 1, method 100 begins at operation 101 where input image data/video frame data is received. Input image data received at operation 101 is a representation of an image frame provided in any suitable color space or image file format. For example, the input image data may be a decoded representation of an image stored in a memory. In another example, a CM writes the input image data to a buffer as the data is readout from an image sensor in the CM. The input image data includes a plurality of pixel values that are spatially correlated within an image frame. The number of pixel values within one frame of image data depends on the input image resolution, which in further embodiments is a function of a local CM. Although embodiments herein are applicable to any input image resolution, in an exemplary embodiment the input image data is at least a 1920×1080 pixel (2.1 megapixel) representation of an image frame (i.e. Full HD). In exemplary embodiments, the input image data received at operation 101 is in the YUV color space, but RGB, HSL, and HSV color spaces may be employed as well. The input image data may have been preprocessed upstream of method 100 to convert to the YUV/HSL/HSV space from another color space such as the RGB color space, the $YP_BP_R$ (luma, blue difference chroma $Y_B$, and red difference chroma $P_R$) color space, the $YC_BC_R$, (luma Y, blue difference chroma $C_B$, and red difference chroma $C_R$) color space, or the like. In further embodiments, image data received at operation 101 is a video frame being processed through a video pipeline that includes a sensor operative to output raw video data associated with multiple consecutively exposed frames in conformance with any known streaming protocol, such as a MIPI or other protocol. In one exemplary embodiment, xvYCC pixel data output by the video pipeline is converted to YUV (Cb, Cr) format by any known decoding circuitry and received as input at operation 101.

Figure 2:
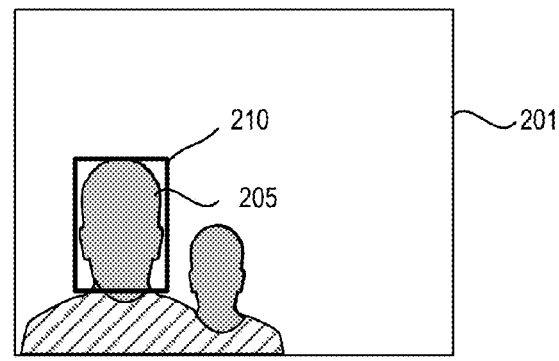
FIG. 2 illustrates a prior video frame with a bounding box surrounding an initialized target object, in accordance with one or more object tracking embodiment.

Method 100 continues at operation 110 where one or more visual descriptor of a target object is generated if no valid descriptor-based model exists (e.g., because the image/frame data received at operation 101 is a first frame or because object tracking in a prior frame failed). At operation 110 a label for an object within the image data is received to bootstrap object tracking method 100. In one embodiment, metadata associated with the input image data/video frame received at operation 101 specifies a bounding box within the frame associated with the target object. A device user, for example, may manually position an indication of the bounding box, around a target object in a view finder and one or more target object descriptor associated with the image data within the bounding box is determined at the initialization operation 110. FIG. 2 illustrates a (prior) video frame 201 with a bounding box 210 surrounding an initialized target object 205, in accordance with one or more object tracking embodiment.

Each visual descriptor initialized may be determined based on some feature or elementary characteristic of the target object (e.g., shape contour, color, texture, etc.). One or more object model maintained and/or employed by the tracking device implementing method 100 may be based on the visual descriptor(s). In one exemplary embodiment, at least one target object descriptor is a color histogram, representing the frequency of pixels within the bounding box that are within a predetermined range of certain color. Color space and quantization of the color histogram may vary, as embodiments are not limited in this respect. For some embodiments, a color histogram is calculated and stored to an electronic memory for one or more patch within the bounding box identifying the target object at the initialization operation.

Figure 3A:
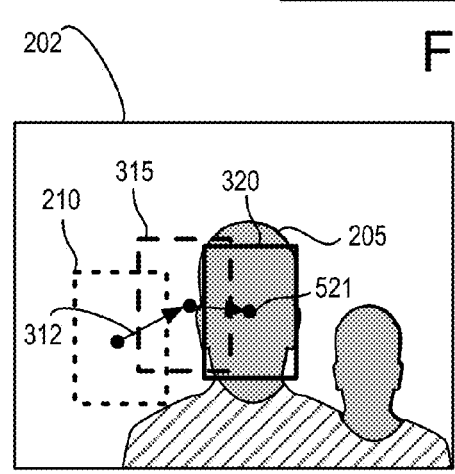
FIGS. 3A and 4A illustrate a position estimation and detection of the target object in a current video frame, in accordance with an embodiment.
Figure 4A:
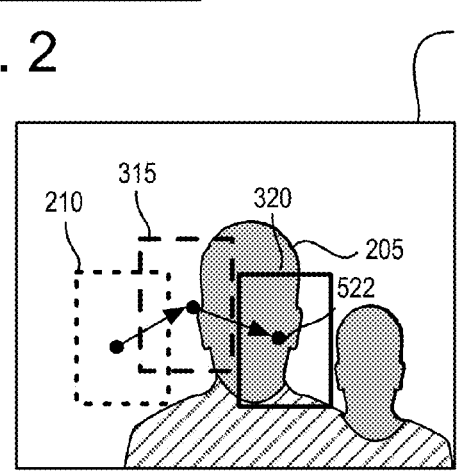

Returning to FIG. 1, in the alterative that a valid target object model is already stored in memory, method 100 proceeds to operation 115 where the position of the target object is estimated based on a prior position of the target object within a prior image data/video frame. In other words, a motion-based estimation of the next position of the tracked object is generated at operation 115 with each iteration of method 100. Such an estimate may be generated for a current frame of data employing positional information from a prior frame (e.g., one or more prior consecutive frame(s)), and/or positional information for the current frame may be employed to generate an estimate for a subsequent frame (e.g., next consecutive frame). As one example, a motion-based prediction model may assume uniformly accelerated motion. After a few frames (e.g., 3 frames), the position of a target object may be estimated for a subsequent frame (e.g., next consecutive frame) using the motion-based prediction model and historical object positional data associated with the prior few frames. FIGS. 3A and 4A illustrate a position estimation and detection of the target object in a current video frame 202, in accordance with an embodiment. In the illustrated examples, an estimate determined with a motion model predicts the target object has motion vector 312 and will move from a position associated with bounding box 210 within frame 201 to an estimated position associated with bounding box 315 within frame 202.

Method 100 continues at operation 120 where the target object is detected (tracked) in the current frame. An output of the detection algorithm employed at operation 120 is a detected position of the target object in the current frame. In advantageous embodiments, the position estimate generated at operation 115 is input to object detection operation 120, for example as a starting position from which a detection algorithm begins. Any detection technique compatible with the chosen object descriptor(s) may be utilized at detection operation 120. Exemplary detection techniques include block matching, optical flow (Lucas-Kanade), phase correlation, and pixel recursive algorithms. In one exemplary embodiment where at least one target object descriptor is a color histogram, histogram matching may be performed iteratively to determine target object location within the current frame. For example, candidate patches of a predetermined size (e.g., same size as the bounding box associated with the current target object descriptor) may be defined for a predetermined pixel position within the current frame. A color histogram for each candidate patch is calculated, stored, and iteratively compared to a color histogram associated with the target object (e.g., associated with an object model predetermined either from initialization operation 110 and/or from a prior iteration of method 100). A position associated with the candidate patch having the best histogram match is then output as the target object's detected position for the current frame. Segmentation of an image frame into candidate patches and selection of successive candidate patches may follow any known algorithm(s), as embodiments are not limited in this respect. For example, mean-shift, or adaptive means-shift algorithms may be utilized to iteratively generate candidate patches until converging to within a predetermined threshold of the current object model.

Referring again to FIG. 3A the object detection algorithm beginning at the position associated with bounding box 315 iterates until converging to a detected object position 521 associated bounding box 320. In FIG. 4A, the object detection algorithm beginning at the position associated with bounding box 315 iterates until converging to a detected object position 522. Detected position 521 is closer to the ground truth position of target object 205, while detected position 522 is farther from the ground truth position of target object 205 (i.e., FIG. 4A illustrates more tracking drift than in FIG. 3A). The different detected positions 521, 522 represent different outcomes that might occur with any given detection algorithm, for example as a function of detector configuration parameters.

Returning to FIG. 1, if object detection fails at operation 120, method 100 proceeds to operation 110 where initialization is performed, for example based on a user's (re) labeling of the target object, or through another bootstrapping technique. In response to detection of the target object (i.e., convergence to a detected position), tracked object data, for example including the tracked position is output in association with the current frame. Method 100 continues with operation 125 where one or more additional object detection flows are determined. The object detection flow(s) determined at operation 125 are to provide a basis for validating the detected position generated at operation 120. In advantageous embodiments, as further described below, only the detected positions that are validated will subsequently serve as learning data for updating of the object model(s).

Any known detection algorithm may be employed to generate a validation object detection flow at operation 125. In embodiments, the detection operation 125 entails any of the object detection/tracking techniques identified above in the context of operation 120. The detection algorithm may for example be the same detection algorithm as in operation 120. In one embodiment where color histogram matching is employed at operation 120 to determine the target object position, histogram matching is again applied at operation 125 using the same object model to validate the detected position. Instead of initializing at the predicted position, the histogram matching process (or other technique) is to begin at an initial position within the current frame that is offset from the detected position determined at operation 120. This positional offset from the detected position is, for example, a predetermined vector, which in certain embodiments is specified as a validation configuration setting. Beginning from the offset position, mean-shift, adaptive means-shift, or other suitable algorithm is utilized to iteratively generate candidate patches until convergence to within a predetermined threshold of the current object model. The validation object detection flow is then compared to the detected object position generated at operation 120. If the validation detection algorithm arrives to within threshold proximity of the detected position, the detected object is clearly differentiated from surroundings and the detected position (or some function thereof) is deemed a "validated position" of the target object.

In further embodiments where a plurality of validation detection flows are determined at operation 125, validation is conditioned on the plurality of detection flows converging on the detected position. For such embodiments, the number of validation detection flows (e.g., 2, 3, 4, etc.), as well as the initial locations (i.e., where the validation detection flows begin) may be configurable validation parameters. A user configuration setting may for example specify, either directly or indirectly, the number validation detection flows, the vector offset of each initial location, and convergence threshold(s).

Figure 3B:
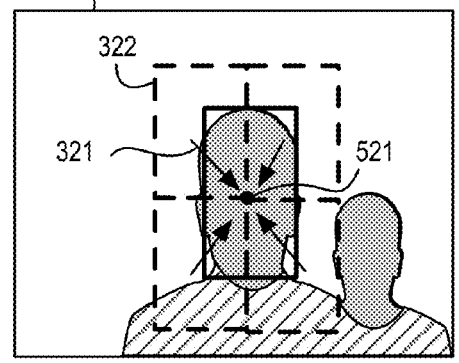
FIGS. 3B and 4B illustrate object detection flows for the current video frame depending on the target object detection, in accordance with an embodiment.
Figure 4B:
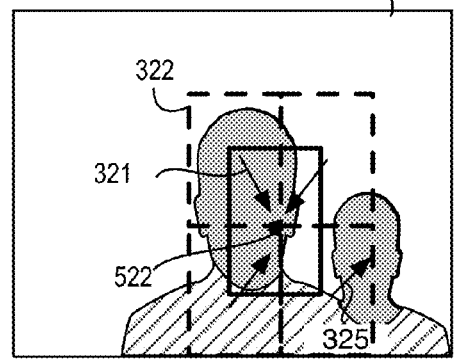

FIG. 3B, 4B illustrate exemplary embodiments where four separate validation detection flows 321 are determined for current frame 202. Each detection flow 321 is begins within a bounding box 322, which may have a predetermined size. Each of four bounding boxes 322 is associated with a positional offset from the detected position, for example covering four quadrants of equal size on a grid centered at detected position 521. While four object detection flows forming quadrants intersecting at the detected position advantageously enable analysis of background surrounding the object detected at operation 120, more or fewer validation detection flows may be employed in substantially the same manner. FIG. 3B further illustrates one example where each of the four object detection algorithms beginning at the offset position iterates until converging toward detected position 521. Detected position 521 is therefore to be validated. FIG. 4B further illustrates another example where detection flow 325 fails to converge to detected position 522. The detected position 522 is therefor not to be validated.

In embodiments, new object models are determined using learning data from only validated detection results. Coverage of the learning data may therefore be limited to only those detection results having a threshold level of stability. Returning to FIG. 1 for example, method 100 proceeds to learning operation 130 in response to validating the detected position. At operation 130, a new object model is determined using learning data associated with the validated position. Stability of the detected object as object model learning data is improved by limiting learning operation 130 to detection results associated with validated positions. Any learning technique/algorithm may be enlisted at operation 130, as embodiments are not limited in this respect. In one exemplary embodiment where an object model includes one or more color histogram as a descriptor, the object model is updated at operation 130 with a color histogram generated from a patch associated with the validated position.

Method 100 continues to operation 135 where diversity of the object models stored for a given target object is maximized by culling the most redundant models from the set of models stored in memory. In one exemplary embodiment, a model replacement strategy is employed to add a new model determined at operation 130 to a predetermined number of object models stored in memory. Such replacement is advantageously predicated on replacing a most redundant object model with each new object model to be added. In one exemplary embodiment, model redundancy is assessed based on a comparison of all pairings of stored object models. For example, in a set of object models, a distance vector is determined for each pairing of the stored object models. All distance vectors associated with each stored object model may then be summed. The object model associated with the smallest summed distance is then to be removed as the least diverse model. The model determined at operation 130 may then be stored into memory as one of the fixed number of object models in the set.

A single iteration of method 100 is completed at operation 140 where a predetermined object model is selected, for example to analyze a next consecutive frame. In one advantageous embodiment, object model selection for a subsequent frame is based on a comparison of the stored model set with the object model employed in a prior frame. For example, stored models may be compared to the object model employed in the current frame and the model with the best match to a current descriptor of the object at the detected position is selected for use in the next iteration of method 100. In response to failing to validate the detected position, the current object model may no longer provide a best match to a descriptor generated at the last detected position, and a stored model having a better match may be selected at operation 140. To maintain model coherency, the model employed in the current frame may be relied upon as a default object model for the next frame. For example, in one embodiment where all the stored models fail to match the descriptor to within a predetermined threshold, the object model employed in the current (prior) frame is retained for the next (current) frame. In a further embodiment, the object model employed in the current (prior) frame is retained for the next (current) frame in response to the stored models failing to match the descriptor by a threshold amount greater than the object model employed in the current (prior) frame.

Method 100 is then iterated, processing each subsequently received frame of image data. The tracked object data (e.g., including the tracked position) is stored to an electronic memory in each iteration. The tracked object data may then be associated, for example as metadata, with a given frame of image data where it may be utilized downstream within the image processing pipeline.

Figure 5:
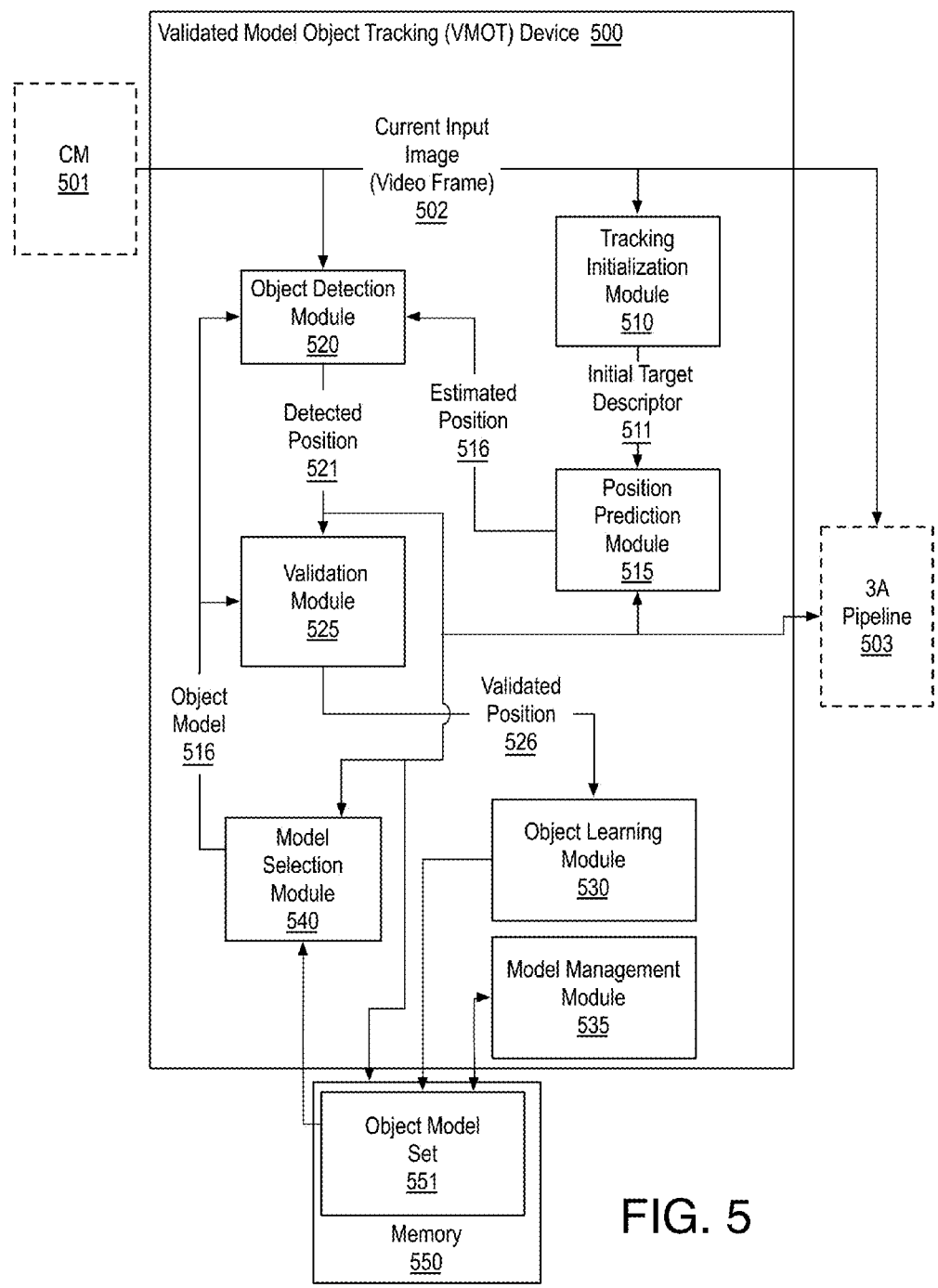
FIG. 5 is a functional block diagram of a video streaming system including a validated model object tracking (VMOT) device, in accordance with embodiments.

FIG. 5 is a functional block diagram of a validated model object tracking (VMOT) device 500, in accordance with embodiments. In exemplary embodiments, VMOT device 500 is computerized to perform the object tracking method 100 in an automated fashion. VMOT device 500 is to receive or retrieve input image data associated with a current image from 502 from a buffer storing at least one of a decoded representation of an input image frame, or a captured image exposed at the input image resolution by a camera hardware module (CM) 501. In one embodiment, current input image frame 500 is one frame in a stream of consecutively exposed image data frames written to a buffer by a CM 501 at a given video frame rate. VMOT device 500 includes logic to perform each of the position estimation, object detection, validation, model management, and model selection as described above.

As further illustrated in FIG. 5, VMOT device 500 further includes an object detection module 520 coupled to receive the current input frame 502. Object detection module 520 is further coupled to an output of model selection module 540, from which object detection module 520 is to receive a predetermined object model 516. Object detection module 520 is further coupled to an output of position prediction module 515. Object detection module 520 is to receive an estimated target object position 516 for the current input image frame. Object detection module 520 includes logic to detect, with a detection algorithm initialized at the estimated position 516, a position of a target object in the current input image/video frame. An output from object detection module 520 is coupled to an input of validation module 525. Object detection module 520 is to pass a detected object position 521 to validation module 525. In the exemplary embodiment illustrated in FIG. 5, detection module 520 also outputs detected position 521 to 3A pipeline 503 along with current input image 502. Detected position 521 may be further stored to an electronic memory 550.

Validation module 525 is further coupled to an output of model selection module 540 and is to receive the current object model 516. Validation module 525 includes logic to determine one or more object detection flows for the current input image/video frame 502 based on the object model 516. Validation module 525 may for example include paralleled logic to perform the plurality of validation processes concurrently. For example, validation module 525 may instantiate a processing thread for each of a plurality of object detection flows initialized within the current frame at a different position that has a unique offset from the detected position 521. As another example, validation module 525 may include paralleled logic circuitry to process each of a plurality of object detection flows through parallel pipelines. In the exemplary embodiment described above, a position of the target object in the current video frame is validated using at least one detection algorithm beginning within each of four windows of equal size covering adjacent quadrants within the current video frame. Validation module 525 further includes logic to evaluate convergence of the one or more object detection flows with detected position 521.

An output of validation module 525 is further coupled to an input of object learning module 530. Object learning module 530 receives learning data such as a color histogram and/or other object descriptors associated with a bounding box referenced to validated position 526. Object learning module includes logic to determine a new object model based on the learning data in response to the object detection flows converging toward detected position 521. A new object model determined from the current frame is output to memory 550, which is to store a plurality of object models as object model set 551.

In further embodiments, and as further illustrated in FIG. 5, VMOT device 500 includes a model management module 535 further coupled to memory 550. Model management module 535 includes logic to maintain a predetermined number of stored object models by removing an object model from object model set 551 for each new object model output by object learning module 530. In an exemplary embodiment, module management module 535 includes logic to determine a distance between all pairs of object modules in model set 551; sum the determined distances associated with each object model; and remove the object model having the smallest summed distance from memory 550.

Model selection module 540 is coupled to memory 550 and includes logic to access object model set 551, and to select object model 516 from object model set 551. In one exemplary embodiment, object selection module 540 is to select for the next frame an object model that best matches a descriptor (e.g., color histogram) of the target object at detected position 521. In further embodiments, model selection module 540 further includes logic to select the object model employed in a prior frame (or select for the next frame the object model used in the current frame) in response to the stored object models failing to match the target object descriptor(s) to within a predetermined threshold, or failing to match the descriptor(s) by a threshold amount greater than the object model employed in the prior (current) frame.

In the exemplary embodiment, VMOT device 500 further includes a position prediction module 515 with an input coupled to detection module 520 through which a detected position 521 from a prior frame is to be received as a prior target object position. Position prediction module 515 further includes an input coupled to tracking initialization module 510 through which a prior target position is bootstrapped if the current frame 502 is a first frame. Position prediction module 515 includes logic to estimate a position of the target object within the current frame based on an input prior position and a motion prediction model.

Figure 6:
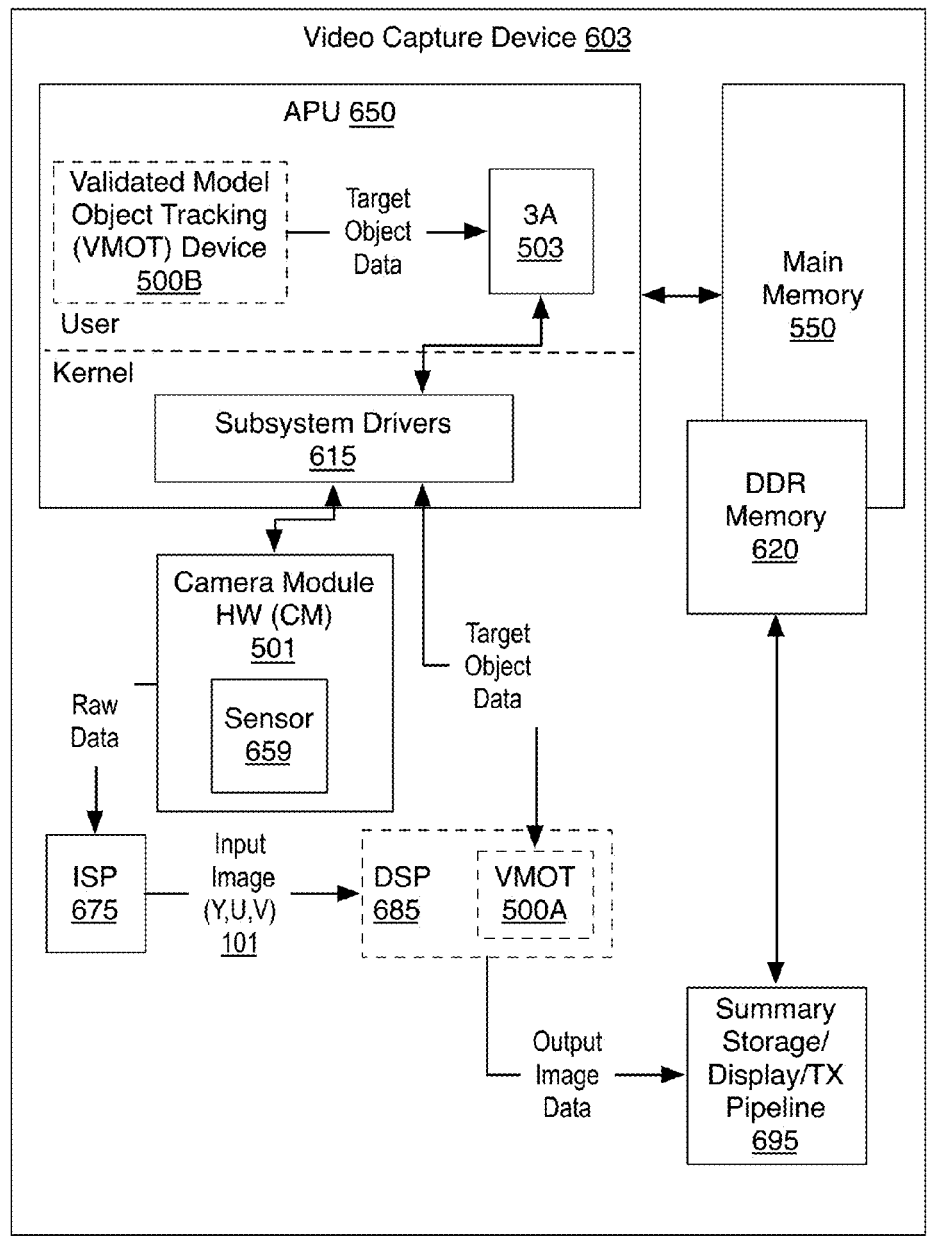
FIG. 6 illustrates a video capture device including a VMOT device, in accordance with one or more embodiment.

FIG. 6 further illustrates how a real-time validated model object tracking device may be integrated with various other components of a video capture device 603 to provide enhanced video camera output suitable for both high frame exposure rates and low image processing overhead. Video capture device 603 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Platform 603 includes CM 501. In the exemplary embodiment, CM 501 further includes a camera sensor 659. Sensor 659 may be a HD, FHD, QXGA, WQXGA, or QSXGA-format digital image device, for example. Camera sensor 659 may provide a color resolution of 10 bits, or more per pixel, is operable to capture continuous video frames progressively. Sensor 659 may have a pixel frequency of 170 MHz, or more. Camera sensor 659 may include an RGB Bayer color filter, an analog amplifier, an A/D converter, other components to convert incident light into a digital signal corresponding to raw image data. Sensor 659 may be controlled to operate a rolling shutter or electronic focal plane shutter process where pixels are read out progressively in a line-sequential fashion for a frame. In exemplary video embodiments, sensor 659 outputs multiple consecutively exposed frames. CM 501 outputs raw data associated with the consecutively exposed frames in conformance with any known streaming protocol, such as a MIPI. Streamed raw video data is input to ISP 675. ISP 675 is to receive and analyze frames of raw video data during the horizontal and/or vertical blanking periods associated with CM 501. During raw image data processing, ISP 675 may perform one or more of color space conversion, noise reduction, pixel linearization, and shading compensation, for example.

Pre-processed video data output by ISP 675 may be buffered in a FIFO manner queued as input image data ready for object tracking. In exemplary embodiments, DSP 685 and/or applications processor (APU) 650 implements one or more of the validated model object tracking device modules depicted in FIG. 5. DSP 685 may for example include one or more fixed function, or semi-programmable logic circuits to perform one or more stages of the object detection method 100 described above. For example, a fixed function module may be utilized to implement one or more of position estimation, object detection, validation, model learning, model management, and model selection. Subsystem drivers 615 within a kernel space of an operating system (OS) instantiated by APU 650 may control various object tracking and validation parameters, such as validation detection flow positioning. Access to the object tracking and validation control parameters may be provided through an application layer executing in a user space of the OS.

Both software and hardware implementations of the validated model object tracking device 500 are well suited to implementing tracking method 100 at pace with a high exposure frame rate at minimal power. For hardware implementations, object tracking device 500 may be implemented by fixed function logic, for example provided as VMOT 500A in DSP 685. For software implementations, any known programmable processor, including a core of APU 650, an execution unit of a graphics processor, or other similar vector processor, may be utilized to implement the logic of VMOT device 500B. For such software-implemented embodiments, DSP 685 need not implement fixed function circuitry relevant VMOT device 500A (as denoted by dashed lines in FIG. 6). APU 650 may be solely responsible for generating target object data from input image data received from ISP 675. Such software-based implementations are advantageously more flexible than fixed function logic circuitry. In one exemplary embodiment, the VMOT device 500B is instantiated through the user space of APU 650. APU 650 executes these algorithms at a rate sufficient to perform the object tracking method 100 in real time with frame generation by CM 501. APU 650 may be programmed with instructions stored on a computer readable media to cause the processor to perform any of the operations of object tracking method 100.

As further illustrated in FIG. 6, target object data may be output to storage/display/transmission pipeline 695. In one exemplary storage pipeline embodiment, target object data is written to electronic memory 620 (e.g., DDR, etc.) to supplement stored input image data. Memory 620 may be separate or a part of a main memory 610 accessible to APU 650. Alternatively, or in addition, storage/display/transmission pipeline 695 is to transmit target object data and/or input image data off video capture device 503.

In one exemplary embodiment illustrated by FIG. 6, APU 650 further includes 3A module 503 that is to implement one or more camera control algorithm (CCA). Exemplary CCA algorithms include automatic white balancing (AWB), automatic focus (AF), and automatic exposure control (AEC), often referred to together as "3A" control. AEC and AF involve the control of CM 501, while AWB involves the control of ISP 675. Exemplary CM control parameters include aperture size, shutter speed, neutral density (ND) filter control, flash power, analog gain (AG), and digital gain (DG). Exemplary ISP control parameters include white balancing gains, lens shading correction (LSC) gains, and noise suppression. In embodiments, 3A module 503 generates camera control parameters based on tracked object data output from validated model tracking device (e.g., 500B). For example, 3A module 503 is to execute at least one of an automatic focus (AF) algorithm, automatic exposure (AE) algorithm, or automatic white balance (AWB) algorithm based on a detected position output from validated model object tracking device 500B.

Figure 7:
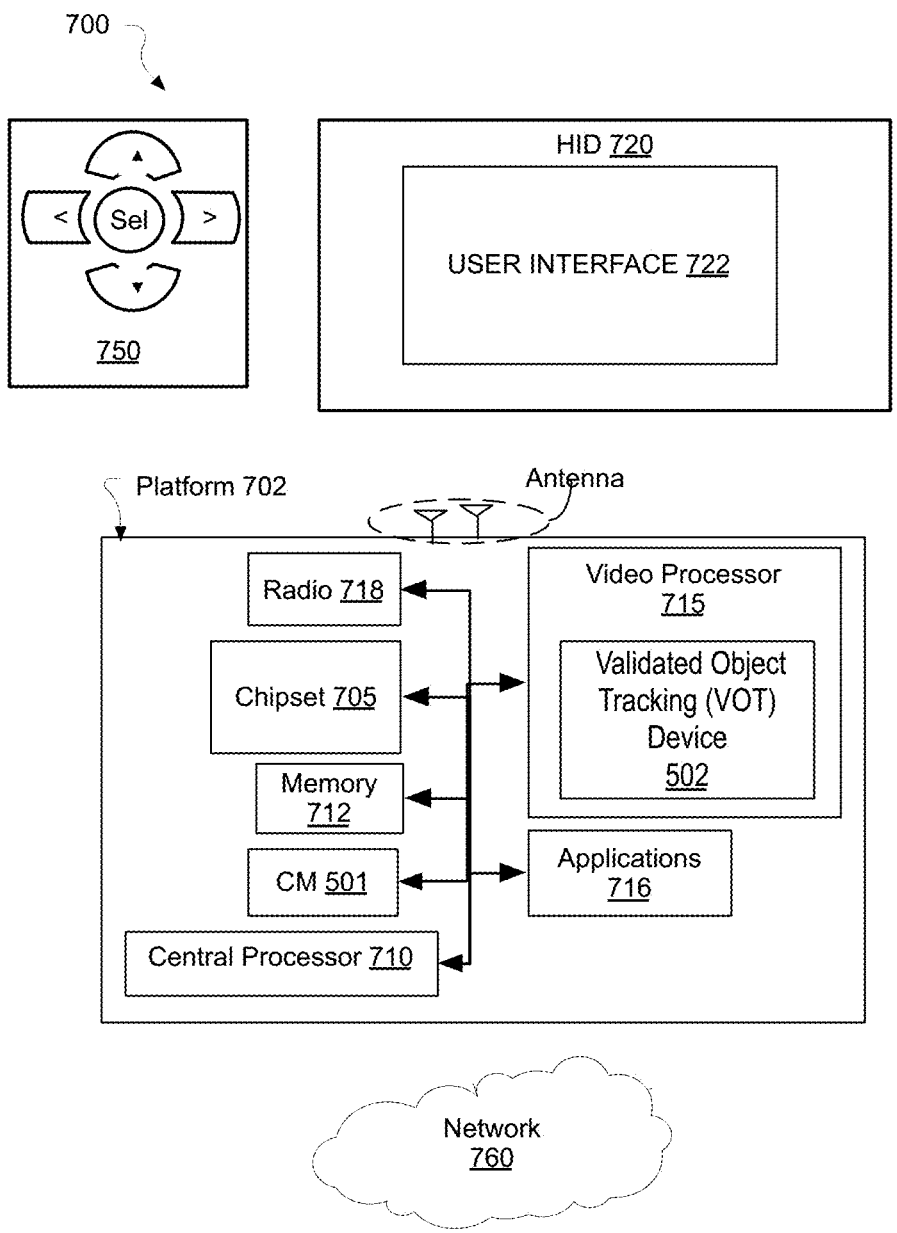
FIG. 7 is a diagram of an exemplary ultra-low power system with a VMOT device architecture, in accordance with one or more embodiment.

FIG. 7 is a diagram of an exemplary ultra-low power system 700 employing a real-time validated object tracking device, in accordance with one or more embodiment. System 700 may be a mobile device although system 600 is not limited to this context. System 700 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

System 700 includes a device platform 702 that may implement all or a subset of the various object tracking methods and any of the validated model object tracking device modules described above in the context of FIG. 1-FIG. 6. In various exemplary embodiments, video processor 715 executes objected tracking and validation. Video processor 715 includes logic circuitry implementing validated model object tracking device 500 to track objects in images synchronously with video frame data streamed from CM 501, for example as described elsewhere herein. In some embodiments, one or more computer readable media may store instructions, which when executed by CPU 710 and/or video processor 715, cause the processor(s) to execute one or more object tracking and validation algorithm, such as any of those described in detail above. One or more image data frame exposed by CM 501 may then be stored in memory 712 as enhanced and/or supplemented image data.

In embodiments, device platform 702 is coupled to a human interface device (HID) 720. Platform 702 may collect raw image data with CM 501, which is processed and output to HID 720. A navigation controller 750 including one or more navigation features may be used to interact with, for example, device platform 702 and/or HID 720. In embodiments, HID 720 may include any television type monitor or display coupled to platform 702 via radio 718 and/or network 760. HID 720 may include, for example, a computer display screen, touch screen display, video monitor, television-like device, and/or a television.

In embodiments, device platform 702 may include any combination of CM 501, chipset 705, processors 710, 715, memory/storage 712, applications 716, and/or radio 718. Chipset 705 may provide intercommunication among processors 710, 715, memory 712, video processor 715, applications 716, or radio 718.

One or more of processors 710, 715 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 712 may be implemented as a volatile memory device such as, but not limited to, a Random Access Memory (RAM), Dynamic Random Access Memory (DRAM), or Static RAM (SRAM). Memory 712 may also be implemented as a non-volatile storage device such as, but not limited to flash memory, battery backed-up SDRAM (synchronous DRAM), magnetic memory, phase change memory, and the like.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The validated object tracking and associated object tracking and validation processes comporting with exemplary embodiments described herein may be implemented in various hardware architectures, cell designs, or "IP cores."

Figure 8:
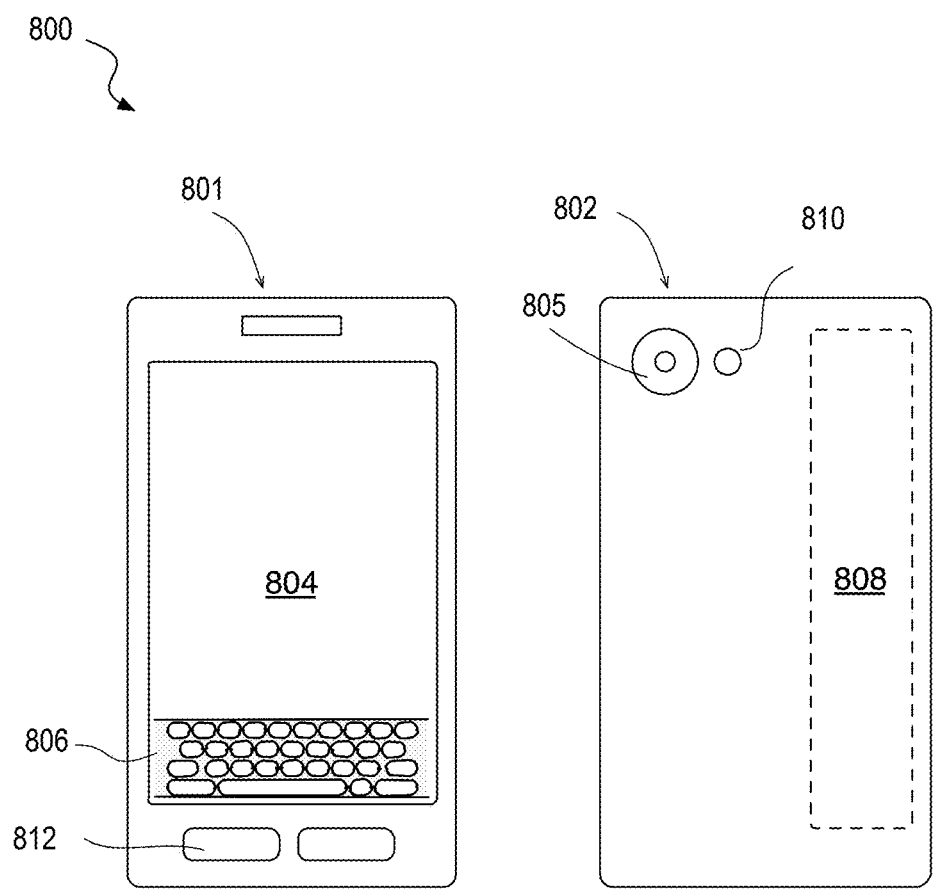
FIG. 8 is a diagram of an exemplary mobile handset platform, arranged in accordance with one or more embodiment.

As described above, system 700 may be embodied in varying physical styles or form factors. FIG. 8 further illustrates embodiments of a mobile handset device 800 in which system 700 may be embodied. In embodiments, for example, device 800 may be implemented as a mobile computing handset device having wireless capabilities. As shown in FIG. 8, mobile handset device 800 may include a housing with a front 801 and back 802. Device 800 includes a display 804, an input/output (I/O) device 806, and an integrated antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. Embodiments are not limited in this context. Integrated into at least the back 802 is camera 805 (e.g., including a lens, an aperture, and an imaging sensor), and a flash 810, both of which may be components of a CM through which streaming video is exposed and output to the object tracking system as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as undisclosed implementations readily apparent to persons skilled in the art to which the present disclosure pertains are deemed to be within the spirit and scope of the present disclosure.

The following paragraphs briefly describe some exemplary embodiments:

In one or more first embodiment, a computer-implemented method of tracking a target object comprises detecting, with a predetermined object model, a position of the target object in a current video frame beginning at a predetermined position within the frame. The method further comprises determining at least one object detection flow for the current video frame, each object detection flow beginning at a different position within the frame, each different position having a unique offset from the detected position. The method further comprises validating the detected position of the target object in response to the object detection flows converging toward the detected position. The method further comprises determining a new object model using the validated position as learning data in response to validating the detected position.

In furtherance of the first embodiment, the method further includes determining at least one object detection flow further comprises determining a plurality of object detection flows. The method further includes determining the plurality of object detection flows further comprises detecting, with the predetermined object model, a position of the target object in the current video frame using at least one detection algorithm beginning within each of four bounding boxes of equal size covering adjacent quadrants within the current video frame, the quadrants centered at the estimated position.

In furtherance of the embodiment immediately above, the at least one detection algorithm comprises one detection algorithm selected from the group consisting of block matching, optical flow, and histogram matching, and a same detection algorithm is employed for both detecting the position and validating the detected position.

In furtherance of the first embodiment, the method further comprises selecting the predetermined object model from a plurality of predetermined object models stored in a memory based on a comparison of the plurality with the object model employed in a prior frame, the plurality including a fixed number of object models. The method further comprises estimating a position of the object within a next video frame based on the validated position of the target object.

In furtherance of the embodiment immediately above, selecting the predetermined object model further comprises at least one of selecting from the plurality an object model having the best match to a descriptor of the target object at the detected position, and selecting the object model employed in a prior frame in response to the plurality of object models failing to match the descriptor to within a predetermined threshold, or failing to match the descriptor by a threshold amount greater than the object model employed in a prior frame.

In furtherance of the first embodiment, the method further includes maintaining a predetermined number of object models for the target object by removing a redundant model from the plurality for each new object model added to the plurality.

In furtherance of the embodiment immediately above, removing the redundant model further comprises performing a comparison between all pairings of the object models in the plurality. The comparison further comprises determining distances between all pairs of the models, summing the distances, and removing the object model having the smallest summed distance.

In furtherance of the first embodiment, the method further comprises determining the predetermined position by estimating, based on a prior position of the target object within a prior video frame, the position of the target object within the current video frame.

In furtherance of the embodiment immediately above, the estimated position is based on a motion prediction model.

In furtherance of the embodiment immediately above, the method further comprises initializing object tracking by computing one or more descriptor for the target object based on pixel data associated with a bounding box containing the predetermined position. The initializing is performed in response to failing to detect a position of the target object in the current video frame.

In furtherance of the embodiment immediately above, the one or more descriptor comprises a color histogram associated with pixels contained within the bounding box.

In one or more second embodiment, a computerized object tracking device comprises a means to perform any one of the first embodiments.

In furtherance of the second embodiment, the means further comprises at least one of an applications processor comprising a user space and a kernel space, or an image signal processor, the processor including circuitry to perform at least one of the first embodiments.

In one or more third embodiment, a computerized object tracking device comprises an object detection module to detect, with a detection algorithm and a predetermined object model, a position of a target object in a current video frame, the detection algorithm to begin at a predetermined position within the frame. The device further comprises a position validation module coupled to the object detection module. The validation module to determine one or more object detection flows for the current video frame, each object detection flow beginning at a different position within the current frame, each different position having a unique offset from the detected position. The validation module to evaluate convergence of the object detection flows. The device further comprising an object model learning module coupled to the position validation module, and to determine a new object model using the validated position as learning data in response to the object detection flows converging toward the detected position.

In furtherance of the third embodiment, the position validation module is to detect, with the predetermined object model, a position of the target object in the current video frame using at least one detection algorithm beginning within each of four windows of equal size covering adjacent quadrants within the current video frame, the quadrants centered at the estimated position.

In furtherance of the third embodiment, the device further comprises a memory to store a plurality of object models. The device further comprises a model management module coupled to the memory, and to maintain a predetermined number of the object models by removing a redundant model from the plurality for each new object model added to the plurality. The model management module is to determine a distance between all pairs of the object models, sum the distances, and remove the object model having the smallest summed distance.

In furtherance of the third embodiment, the device further comprises a position prediction module to determine, the predetermined position by an estimation of the position of the target object within the current video frame based on a prior position of the target object within a prior video frame and a motion prediction model.

In furtherance of the third embodiment, the device further comprises an object model selection module to select from a plurality object models an object model having the best match to a descriptor of the target object at the detected position, and to select the object model employed in a prior frame in response to the plurality of object models failing to match the descriptor to within a predetermined threshold, or failing to match the descriptor by a threshold amount greater than the object model employed in a prior frame.

In furtherance of the third embodiment, the device further comprises a 3A module to execute at least one of an automatic focus (AF) algorithm, automatic exposure (AE) algorithm, or automatic white balance (AWB) algorithm based on the detected position.

In one or more fourth embodiment, one or more computer-readable storage media has instructions stored thereon, which when executed by a processor, cause the processor to perform any one of the first embodiments.

In one or more fifth embodiment, one or more computer-readable storage media has instructions stored thereon, which when executed by a processor, cause the processor to perform a method comprising detecting, with a predetermined object model, a position of the target object in a current video frame beginning at a predetermined position within the frame, determining a plurality of object detection flows for the current video frame, each object detection flow beginning at a different position within the frame, each different position having a unique offset from the detected position, validating the detected position of the target object in response to the object detection flows converging toward the detected position, and determining a new object model using the validated position as learning data in response to validating the detected position.

In furtherance of the fifth embodiment, the storage media further stores instructions thereon, which when executed by a processor, cause the processor to further perform a method comprising detecting, with the predetermined object model, a position of the target object in the current video frame using at least one detection algorithm beginning within each of four bounding boxes of equal size covering adjacent quadrants within the current video frame, the quadrants centered at the estimated position.

In furtherance of the fifth embodiment, the at least one detection algorithm comprises one detection algorithm selected from the group consisting of block matching, optical flow, and histogram matching. The detection algorithm selected is employed both for detecting the target object and validating the detected position.

In furtherance of the fifth embodiment, the media further stores instructions thereon, which when executed by a processor, cause the processor to further perform a method comprising maintaining a predetermined number of object models for the target object by removing a redundant model from the plurality for each new object model added to the plurality.

In furtherance of the embodiment immediately above, removing the redundant model further comprises performing a comparison between all pairings of the predetermined object models in the plurality. The comparison further comprises determining distances between all pairs of the models, summing the distances, and removing the object model having the smallest summed distance.

In furtherance of the fifth embodiment, the media further stores instructions thereon, which when executed by a processor, cause the processor to further perform the method comprising selecting the predetermined object model from a plurality of predetermined object models stored in a memory, the plurality including a fixed number of object models, and estimating a position of the object within a next video frame based on the validated position of the target object.

In furtherance of the embodiment immediately above, wherein selecting the predetermined object model further comprises selecting one or more object model from the plurality having the best match to the target object at the detected position, and/or selecting the object model employed in a prior frame in response the plurality of object models failing to match within a predetermined threshold or in response to two or more object models having the same match.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A method for visually tracking a target object over multiple frames of video, the method comprising:

detecting, with a predetermined object model, a position of the target object in a current video frame beginning at a predetermined first position within the frame;

determining at least one object detection flow for the current video frame, the object detection flow beginning at a position within the frame different than the first position and having a predetermined positional offset from the detected position;

validating the detected position of the target object in response to the object detection flow arriving within a threshold proximity to the detected position; and determining a new object model using the validated position as learning data in response to validating the detected position.

2. The method of claim 1, wherein:

determining the at least one object detection flow further comprises determining a plurality of object detection flows, wherein each object detection flow begins at a different position within the frame associated with a unique positional offset from the detected position; and determining the plurality of object detection flows further comprises detecting, with the predetermined object model, a position of the target object in the current video frame using at least one detection algorithm beginning within each of four bounding boxes of equal size covering adjacent quadrants within the current video frame, the quadrants centered at the detected position.

3. The method of claim 2, wherein:

the at least one detection algorithm comprises one detection algorithm selected from the group consisting of block matching, optical flow, and histogram matching, and a same detection algorithm is employed for both detecting the position and validating the detected position.

4. The method of claim 1, further comprising:

selecting the predetermined object model from a plurality of predetermined object models stored in a memory based on a comparison of the plurality with the object model employed in a prior frame, the plurality including a fixed number of object models; and estimating a position of the object within a next video frame based on the validated position of the target object.

5. The method of claim 4, wherein selecting the predetermined object model further comprises at least one of:

selecting from the plurality an object model having the best match to a descriptor of the target object at the detected position;

selecting the object model employed in a prior frame in response to the plurality of object models failing to match the descriptor to within a predetermined threshold, or failing to match the descriptor by a threshold amount greater than the object model employed in a prior frame.

6. The method of claim 1, further comprising:

maintaining a predetermined number of object models for the target object by removing a redundant model from the plurality for each new object model added to the plurality.

7. The method of claim 6, wherein removing the redundant model further comprises performing a comparison between all pairings of the object models in the plurality, wherein the comparison further comprises:

determining distances between all pairs of the models;

summing the distances; and removing the object model having the smallest summed distance.

8. The method of claim 1, further comprising:

determining the predetermined position by estimating, based on a prior position of the target object within a prior video frame, the position of the target object within the current video frame.

9. The method of claim 8, wherein the estimated position is based on a motion prediction model.

10. The method of claim 1, further comprising:

initializing object tracking by computing one or more descriptor for the target object based on pixel data associated with a bounding box containing the predetermined position; and wherein the initializing is performed in response to failing to detect a position of the target object in the current video frame.

11. The method of claim 10, wherein the one or more descriptor comprises a color histogram associated with pixels contained within the bounding box.

12. A computerized object tracking device, comprising:

a processor to:

detect, with a detection algorithm and a predetermined object model, a position of a target object in a current video frame, the detection algorithm to begin at a predetermined first position within the frame;

determine at least one object detection flow for the current video frame, the object detection flow beginning at a position within the current frame different from the first position, and having a predetermined positional offset from the detected position; and validate the detected position based on the object detection flow arriving within a threshold proximity to the detected position; and determine a new object model using the validated position as learning data in response to the object detection flows converging toward the detected position.

13. The object tracking device of claim 12, wherein the processor is to detect, with the predetermined object model, a position of the target object in the current video frame using at least one detection algorithm and a plurality of object detection flows, wherein each object detection flow begins within a corresponding one of four windows of equal size covering adjacent quadrants within the current video frame, the quadrants centered at the detected position.

14. The object tracking device of claim 12, further comprising:

a memory, coupled to the processor, to store a plurality of object models; and the processor to maintain a predetermined number of the object models by removing a redundant model from the plurality for each new object model added to the plurality, and wherein the processor is further to:

determine a distance between all pairs of the object models;

sum the distances; and remove the object model having the smallest summed distance.

15. The object tracking device of claim 12, wherein the processor is to determine the predetermined position by an estimation of the position of the target object within the current video frame based on a prior position of the target object within a prior video frame and a motion prediction model.

16. The object tracking device of claim 12, wherein the processor is to select from a plurality object models an object model having the best match to a descriptor of the target object at the detected position, and to select the object model employed in a prior frame in response to the plurality of object models failing to match the descriptor to within a predetermined threshold, or failing to match the descriptor by a threshold amount greater than the object model employed in a prior frame.

17. The object tracking device of claim 12, wherein the processor is further to execute at least one of an automatic focus (AF) algorithm, automatic exposure (AE) algorithm, or automatic white balance (AWB) algorithm based on the detected position.

18. One or more non-transitory computer-readable storage media, with instructions stored thereon, which when executed by a processor, cause the processor to perform a method comprising:
   detecting, with a predetermined object model, a position of the target object in a current video frame beginning at a predetermined first position within the frame;
   determining at least one object detection flow for the current video frame, the object detection flow beginning at a position within the frame different from the first position and having a predetermined positional offset from the detected position;
   validating the detected position of the target object in response to the object detection flow arriving within a threshold proximity to the detected position; and
   determining a new object model using the validated position as learning data in response to validating the detected position.

19. The media of claim 18, further storing instructions thereon, which when executed by a processor, cause the processor to further perform a method comprising:
   determining a plurality of object detection flows, wherein each object detection flow begins at a different position within the frame associated with a unique positional offset from the detected position, by detecting, with the predetermined object model, a position of the target object in the current video frame using at least one detection algorithm beginning within each of four bounding boxes of equal size covering adjacent quadrants within the current video frame, the quadrants centered at the detected position.

20. The media of claim 19, wherein:
   the at least one detection algorithm comprises one detection algorithm selected from the group consisting of block matching, optical flow, and histogram matching, and
   the detection algorithm selected is employed both for detecting the target object and validating the detected position.

21. The media of claim 18, further storing instructions thereon, which when executed by a processor, cause the processor to further perform a method comprising:
   maintaining a predetermined number of object models for the target object by removing a redundant model from the plurality for each new object model added to the plurality.

22. The media of claim 21, wherein removing the redundant model further comprises
   performing a comparison between all pairings of the predetermined object models in the plurality, wherein the comparison further comprises:
determining distances between all pairs of the models;
summing the distances; and
removing the object model having the smallest summed distance.

23. The media of claim 18, further storing instructions thereon, which when executed by a processor, cause the processor to further perform a method comprising:
   selecting the predetermined object model from a plurality of predetermined object models stored in a memory, the plurality including a fixed number of object models; and
   estimating a position of the object within a next video frame based on the validated position of the target object.

\* \* \* \* \*